No. 808,910. PATENTED JAN. 2, 1906.
F. A. DUNHAM.
FAUCET.
APPLICATION FILED APR. 11, 1905.
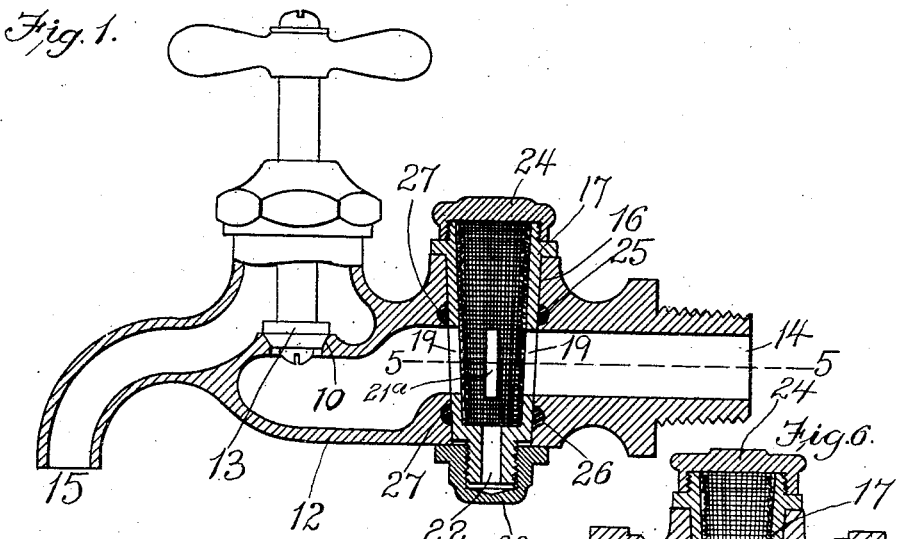
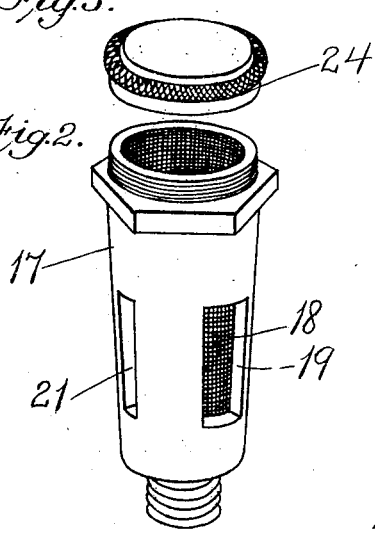
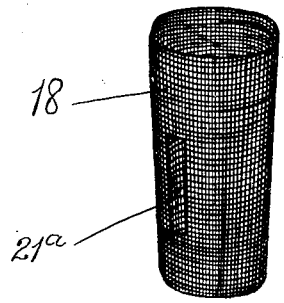
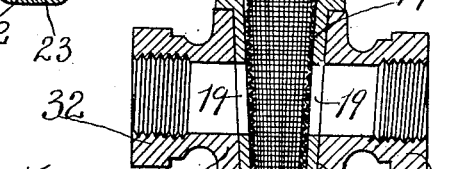
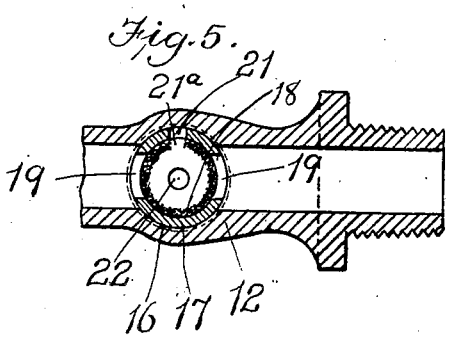
Witnesses.
P. H. Pezzetti
E. Batchelder
Inventor.
F. A. Dunham
By Wright Brown Quimby
Attys

UNITED STATES PATENT OFFICE.

FRANK A. DUNHAM, OF BROCKTON, MASSACHUSETTS.

FAUCET.

No. 808,910.     Specification of Letters Patent.     Patented Jan. 2, 1906.

Application filed April 11, 1905. Serial No. 255,032.

*To all whom it may concern:*

Be it known that I, FRANK A. DUNHAM, of Brockton, in the county of Plymouth and State of Massachusetts, have invented certain new and useful Improvements in Faucets, of which the following is a specification.

This invention has for its chief object to provide the casing of a faucet with a filter-holder interposed between the ordinary valve of the faucet and the inlet end of the faucet-casing, the said filter-holder being constructed to cause the water to pass through filtering material on its way to the faucet-valve and also to shut off the liquid from the faucet-valve whenever this operation is desirable, as when the valve needs a new washer or other repairs.

This invention also has for its object to provide for the convenient cleansing of the filtering material in the holder.

The invention consists in improvements which I will now proceed to describe and claim.

Of the accompanying drawings, forming a part of this specification, Figure 1 represents a longitudinal section of a faucet embodying my invention. Fig. 2 represents a perspective view of the filter-holder removed from the casing. Fig. 3 represents a perspective view of the cap portion of the filter-holder. Fig. 4 represents a perspective view of a filter adapted to be inserted in the filter-holder. Fig. 5 represents a section on line 5 5 of Fig. 1. Fig. 6 represents a stop-and-waste appliance embodying my invention.

The same reference characters indicate the same parts in all the figures.

In the drawings, 12 represents the casing of a faucet, and 13 represents the usual or any suitable valve adapted to control the flow of liquid between the inlet end 14 and the outlet end 15 of the casing, the latter having an outer valve-seat 10 for the valve 13. At a suitable point in the casing between the seat of the valve 13 and the inlet end 14 is formed a socket or inner valve-seat 16, which intersects the passage through the casing and is preferably tapering and of circular form in cross-section.

17 represents a filter-holder which is formed as a rotary plug-valve adapted to closely fit and turn in the socket or inner valve-seat 16, said holder being internally chambered to receive a filter 18 of any suitable construction. I have here shown the filter composed of a tube of woven wire; but it is obvious that any other suitable filter construction may be employed. The holder 17 is provided at opposite sides of its periphery with ports 19 19, which coincide with the passage through the casing when the holder is in the position shown in Fig. 1, and thus permits the passage of liquid through the filter. The holder is formed so that when turned from the position shown in Fig. 1 it will shut off the liquid from the valve 13, thus enabling the valve to be removed for repairs, &c., without shutting off the liquid from the inlet end of the faucet-casing. The function of shutting off the liquid from the valve is preferably performed by one of the portions of the holder located between the ports 19, the opposite portion being provided with an opening 21, which communicates with the inlet end of the casing when the liquid is shut off from the valve, said opening permitting the entrance of liquid into the faucet for the purpose of washing out sediment from the interior thereof. The holder is provided at its lower end with an outlet 22 for the escape of the liquid thus entering the filter and the sediment carried thereby. The outlet 22 is normally closed by a removable cap 23. The opposite end of the holder 17 is or may be provided with a movable cap or plug 24, having a screw-thread connection with the holder.

It will be seen that the construction above described provides for the convenient application of a filter to a faucet-casing and also for the shutting off of the liquid from the faucet-valve.

Grooves 25 26 are formed in the walls of the socket 16 immediately above and below the passage through the casing, and in these grooves and surrounding the filter-holder 17 are placed washers 27, of any suitable packing material, which prevent leakage of water between the filter-holder and socket without requiring such tight engagement of the contacting surfaces of these parts as is necessary when no washers are employed, thereby permitting the filter-holder to be turned more easily.

The wire tube 18 may contain any suitable auxiliary filtering material—such as charcoal, sponge, &c.—or said tube may be used without such auxiilary material. The tube 18 is preferably provided with an opening $21^a$, coinciding with the opening 21 in the holder 17, to permit the free entrance of water into the tube when the opening 21 is in position to receive water.

In Fig. 6 I have shown a modification which is a "stop-and-waste" appliance, adapted for application to a line of piping and comprising a casing 30, having an inlet branch 31, an outlet branch 32, and an intermediate socket 33, containing the holder 17. In this case the filter acts on water which flows from the filter to a distant point and may be cleansed by the entering water, as above described.

I claim—

1. A faucet comprising a casing having an inner valve-seat adjacent to the inlet end, and an outer valve-seat adjacent to the outlet end, a valve controlling the outer valve-seat, and a rotary filter-holder formed as a valve seated on the inner valve-seat, and provided with a filter, and with ports which permit the passage of liquid through the filter, the holder being adapted to be adjusted to shut off the liquid from the valve.

2. A faucet comprising a casing having a valve, a socket intersecting the passage between the valve and the inlet end of the casing, a chambered filter-holder adapted to turn in said socket and provided with ports which permit the passage of liquid through the filter, one of the portions of the holder between the ports being closed to shut off the liquid from the valve, while the other portion of the holder between the ports is provided with an opening to permit the entrance of water into the filter for the purpose of cleaning the same, the holder having an outlet at one end and means for closing said outlet.

3. A faucet comprising a casing having a valve, an adjustable holder interposed between the valve and the inlet end of the casing and provided with a filter, and with ports which permit the passage of liquid through the filter, the holder being adapted to be adjusted to shut off the liquid from the valve, and washers surrounding the holder and interposed between the same and the adjacent portions of the casing above and below said ports.

4. An appliance of the character stated, comprising a casing having an inlet, an outlet, and an intermediate socket, a chambered filter-holder adapted to turn in the socket and provided with ports which permit the passage of liquid from the inlet to the outlet through the filter, one of the portions of the holder between the ports being closed to shut off liquid from the casing-outlet, while the other portion of the holder between the ports is provided with an opening to permit the entrance of liquid into the holder and filter, the holder having a waste-outlet extending through the casing, and means for closing the same.

5. An appliance of the character stated, comprising a casing having an inlet, an outlet, and an intermediate socket, a chambered filter-holder adapted to turn in the socket and provided with ports which permit the passage of liquid from the inlet to the outlet through the filter, one of the portions of the holder between the ports being closed to shut off liquid from the casing-outlet, while the other portion of the holder between the ports is provided with an opening to permit the entrance of liquid into the holder and filter, the holder having an opening for the reception of a filter, and a waste opening or outlet, and means for closing said openings.

In testimony whereof I have affixed my signature in presence of two witnesses.

FRANK A. DUNHAM.

Witnesses:
  E. BATCHELDER,
  ARTHUR H. BROWN.